United States Patent [19]

Kawamura et al.

[11] 4,246,636

[45] Jan. 20, 1981

[54] FLYBACK TRANSFORMER HAVING TERMINAL PINS FOR CONNECTION TO PRINTED CIRCUIT BOARDS

[75] Inventors: Junichiro Kawamura, Tokyo; Junichi Iwasawa, Yokohama, both of Japan

[73] Assignee: Denki Onkyo Co., Ltd., Tokyo, Japan

[21] Appl. No.: 946,349

[22] Filed: Sep. 27, 1978

[30] Foreign Application Priority Data

Sep. 27, 1977 [JP] Japan ........................ 52/129815[U]

[51] Int. Cl.[3] .............................................. H02M 1/00

[52] U.S. Cl. ....................................... 363/146; 336/96

[58] Field of Search ........................... 336/96; 363/146

[56] References Cited

U.S. PATENT DOCUMENTS

| | | | |
|---|---|---|---|
| 2,988,715 | 6/1961 | Glzynski et al. | 336/96 |
| 3,533,036 | 10/1970 | Wood | 336/96 |
| 3,665,288 | 5/1972 | Godawski | 315/411 |
| 3,813,574 | 5/1974 | Sato | 336/185 X |
| 3,866,086 | 2/1975 | Miyoshi et al. | 336/185 X |
| 3,904,928 | 9/1975 | Sawada et al. | 336/185 X |
| 3,905,001 | 9/1975 | Sato et al. | 336/96 X |
| 4,039,924 | 8/1977 | Scales et al. | 336/185 X |
| 4,095,206 | 6/1978 | Hishiki | 336/96 |
| 4,161,776 | 7/1979 | Onoue | 363/146 |

*Primary Examiner*—William M. Shoop
*Attorney, Agent, or Firm*—Armstrong, Nikaido, Marmelstein & Kubovcik

[57] ABSTRACT

A flyback transformer which has a coil bobbin provided with a low voltage coil and high voltage coil and a plurality of terminal pins to which the lead wires of these coils are to be connected and attached to the leg of the core, a hollow cylindrical housing which houses the coil bobbin and a housing cap provided with a through hole into which the leg of a core is inserted and contains a rectifier circuit which rectifies high voltage generated by the high voltage coil, wherein the terminal pins are projected from one end of the housing and the leg of the core is inserted into it and the housing cap is mounted on the other end of the housing and a space formed between the housing and the housing cap is filled with an insulating resin.

15 Claims, 13 Drawing Figures

FLYBACK TRANSFORMER HAVING TERMINAL PINS FOR CONNECTION TO PRINTED CIRCUIT BOARDS

BACKGROUND OF THE INVENTION

The present invention relates to a flyback transformer which supplies a high voltage to a cathode-ray tube of the television receiver, particularly a compact flyback transformer having the terminal pins which can be connected to the printed circuit boards of the television receiver.

As known, a rectified high voltage is supplied to the cathode-ray tube of a television set through the flyback transformer and the rectifier circuit. Some types of conventional television receiver sets are made up by separately fixing the flyback transformer and the rectifier box incorporating the rectifier circuit to the chassis. Since a large space is required, such separate installation is not suitable for relatively small television sets of 10 to 14 inch types.

Therefore, a flyback transformer is developed which has an insulating housing made of a plastic material which houses together the high voltage coil, low voltage coil and rectifying circuits and is filled with an incombustible resin compound to insulate these component from the another.

However, the conventional flyback transformer which houses an insulating housing incorporating the rectifying circuit is made up by assemblying and arranging diodes, resistors, capacitors, etc. with respective support members in a space on the outer periphery of the high voltage coil and filling this space with insulating resin. Therefore, the whole shape of the insulating housing is extended in the radial direction of the high voltage coil and consequently the whole body of the flyback transformer becomes large to be unsuitable for attaching on a printed circuit board with other circuitries because of its excessive occupation of the space. Moreover, it is disadvantageous in that it takes a long time to assemble the parts of the rectifying circuit around the high voltage coil and then set the assembly together with the high voltage coil in the insulating housing.

If the low voltage coil, high voltage coil and parts of the rectifying circuit are not firmly secured at predetermined positions in the housing, a leakage flux and distribution capacity vary with each unit of the flyback transformer to be manufactured and it is difficult to manufacture flyback transformers with stable output characteristics. Furthermore, since the spaces between components (coils, circuitries, housing and bobbin) vary, dielectric strength between these components is not sufficient even though the spaces are filled with insulating resin.

SUMMARY OF THE INVENTION

An object of the present invention is to provide a compact type flyback transformer which can be directly connected to the printed circuit board of the television set with its connector pins.

Another object of the present invention is to provide a flyback transformer of an assembly construction which can provide uniform quality flyback transformation.

Another object of the present invention is to provide a flyback transformer in which the components are accurately arranged at the predetermined positions.

Another object of the present invention is to provide a flyback transformer in a construction which facilitates the assembly work.

Another object of the present invention is to provide a flyback transformer which occupies a small space on the printed circuit board.

The flyback transformer in accordance with the present invention comprises a pair of U-shaped cores which are clamped with a metal fixture and U-shaped bolts, coil bobbins which are mounted on the legs of the cores, low potential coil and high voltage coil provided on the coil bobbins, cylindrical housing which houses these coils and coil bobbins, housing cap which is mounted on an opening of the housing and rectifying circuit which is housed in the housing cap.

The coil bobbin has a cylindrical part into which the legs of a pair of cores are inserted and a flange wall and a vertical wall are provided on the outer periphery of cylindrical part with a predetermined distance and the low potential coil, that is, low voltage coil and, if required, other coils such as an automatic gain control coil, automatic frequency control coil, heater coil, blanking coil, etc. are directly wound between these walls. At the same time, the high voltage coil made up by winding in advance is mounted on the outer periphery of the cylindrical part in parallel with the low potential coil. Moreover, a plurality of terminal pins are provided at an opposite side to the high voltage coil and a plurality of lead wires at the low potential side of the high voltage coil and at the low potential coil are connected to corresponding terminal pins, respectively.

The housing comprises an expanded cylindrical part where the high voltage coil is mainly located and a reduced cylindrical part where the low voltage coil and the array of terminal pins are mainly located, thereby a horseshoe type collar is provided on the inner periphery of the edge of the reduced cylindrical part toward the inside and the holes which are tapered from inside toward outside are provided in the collar at respective opposing positions to the terminal pins, which are inserted through the holes. A pair of claws which are extended from the opposing positions and projected outside are provided on the inner edge of the collar and engaged with the edges of the metal fixture to firmly secure the housing.

The housing cap is provided with a central cylinder around the hole into which the legs of the cores are inserted and the high voltage coil is pushed from its side in the axial direction of the cylinder to the predetermined position and maintained at that position. The housing cap is expanded in the axial direction of the cylinder to form an expanded chamber in which the parts of the rectifying circuit are housed, connected for forming the circuit and fixed, and the anode lead wire to which the output terminal of the rectifying circuit is connected is led out from the expanded cylindrical part which is formed in continuation with the expanded chamber. The input end of the rectifying circuit is connected to the lead wire of the high potential side of the high voltage coil.

The space formed by the coil bobbin, housing and housing cap is filled with an electrically insulating resin compound.

DESCRIPTION OF THE PREFERRED EMBODIMENTS

Figure 1:
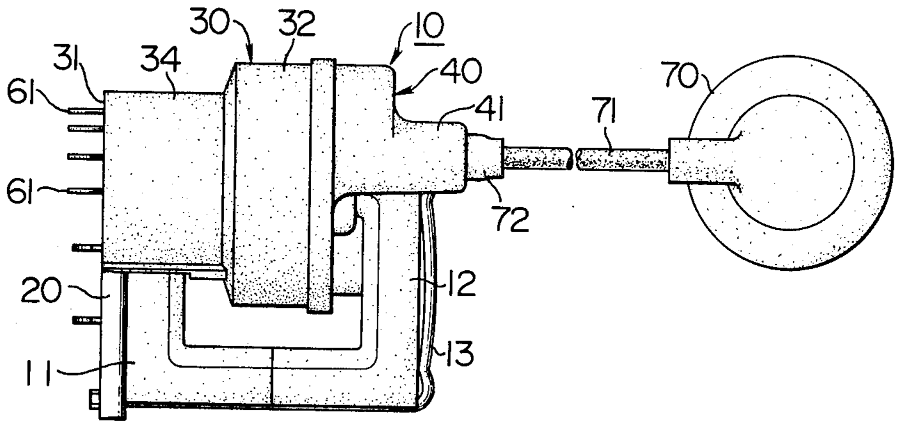
FIG. 1 shows the flyback transformer assembled in accordance with the present invention to which the anode cap and the lead wire for supplying a high voltage to the cathode-ray tube are attached.

Referring to FIG. 1, in the flyback transformer 10 in accordance with the present invention, a pair of U-shaped cores 11 and 12 made of ferrite material are clamped with flat metal fixture 20 and U-shaped bolts 13 and nuts made of iron while the legs are butt-arranged. The legs of cores 11 and 12 are assembled with the coil bobbin, hollow cylindrical housing 30 which houses the coil bobbin and housing cap 40 which closes one opening of the housing 30; these three components are made of, for example, epoxy resin, polycarbonate resin, denaturated polyhenilen oxide resin, polybutylenetelephthalate resin reinforced with glass fiber.

The housing 30 comprises the expanded cylindrical part 32 and the following reduced cylindrical part 34 and a plurality of terminal pins 61 are projected from the other opening 31 of the reduced cylindrical part 34. Moreover, the anode lead wire 71 provided with the anode cap 70 which is connected to the anode of the cathode-ray tube is led out from the cylindrical bulged part 41 of the housing 40 and the rubber cap 72 is fitted to the lead outlet to seal the housing cover 40.

Figure 2:
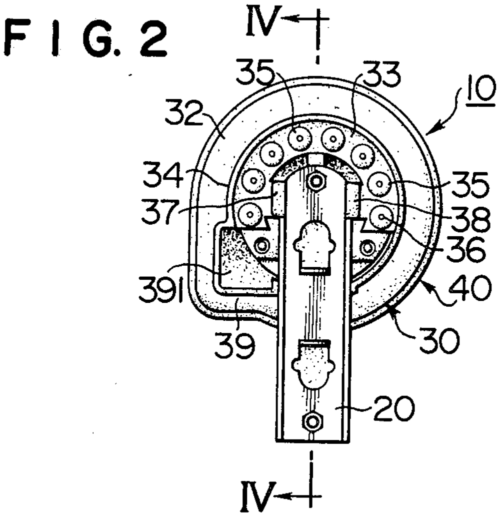
FIG. 2 is a side view of the flyback transformer shown in FIG. 1 which is viewed from the left-handed side before the insulating resin compound is filled in the space.

FIG. 2 shows the side where the flyback transformer is fixed on the printed circuit board (not shown) of the television set. The opening 31 of the reduced cylindrical part 34 of the housing 30 is made integral with the horseshoe type collar 33 which is directed from the inner periphery toward the inside. Circular rises 35 are formed symmetrically in reference to the broken line IV—IV with equal distance between them along the inner periphery of the reduced cylindrical part 34 outside the collar 33 and the hole 36 for penetration of the terminal pin 61 is provided at the center of each stopper 35. The hole 36 has a slightly larger diameter than the diameter of the terminal pin 61. Furthermore, on a pair of L-shaped claws 37 and 38 are provided symmetrically in reference to the broken line IV—IV at the mutually opposing position of the edge of the collar 33 so that these claws are extended inside and projected outside, thus holding one end of the flat metal fixture 20 from both sides and fixing the housing 30 against the flat metal fixture 20.

The housing has the bulged part 39 which is expanded toward the outside. The space 391 formed by this bulged part 39 continues to the housing cover 40 so that the insulating resin compound can be easily injected and distributed to every corner of the housing which houses the low voltage coil, high voltage coil and parts of the rectifying circuit.

Figure 3:
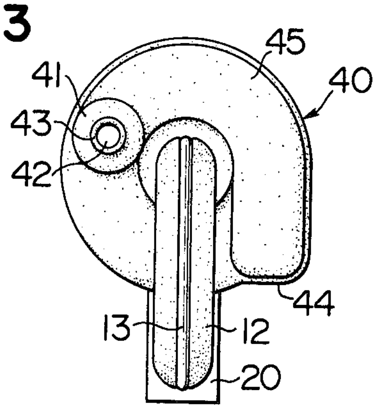
FIG. 3 is a side view of the flyback transformer shown in FIG. 1 which is viewed from the right-handed side and from which the anode cap and the lead wire are omitted.

FIG. 3 shows a view of the flyback transformer which is viewed from the side where the anode lead wire is to be led out. The cylindrical bulged part 41 is projected in a reverse direction to the terminal pin 61 shown in FIG. 1 and provided with the hole 42 for leading out the anode lead wire at its extreme end and the cylindrical projection 43 which has a slightly larger diameter the diameter of the lead wire is formed around the hole 42. The expanded chamber 45 which is expanded to the bulged part 44 of the housing cap 40 in the leading-out direction of the lead wire is provided on the housing cap 40 in continuation to the cylindrical bulged part 41. The bulged part 44 is provided corresponding to the bulged part 39 of the housing 30.

Figure 4:
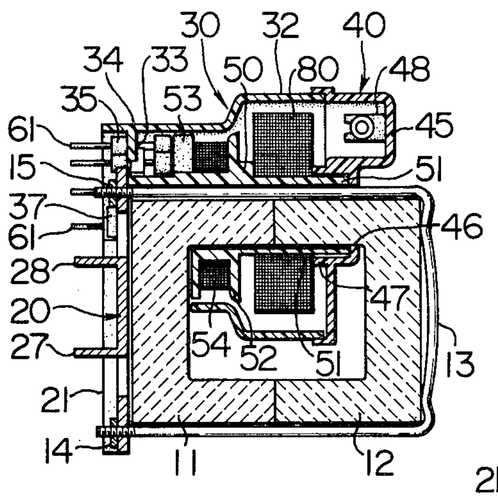
FIG. 4 is a sectional view of the flyback transformer as viewed along the broken line IV—IV in FIG. 2.
Figure 5:
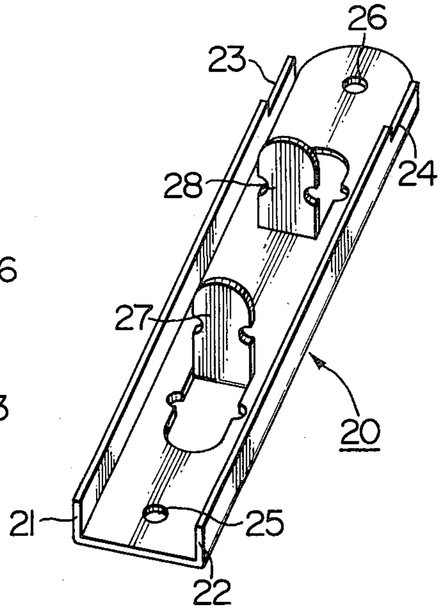
FIG. 5 is a perspective view of the metal fixture employed to clamp the core or fix the flyback transformer to the printed circuit board or the chassis of the television set.

FIG. 4 shows a sectional view of the assembled flyback transformer along the broken line IV—IV in FIG. 2. A pair of cores 11 and 12 are held by and between the U-shaped bolt 13 and the flat metal fixture 20 and can be firmly clamped by driving the nuts 14 and 15 in both ends of bolt 13. The flat metal fixture 20 is made of iron and its both longitudinal ends are bent to form edge walls 21 and 22 which have the same height as shown in FIG. 5 and the steps 23 and 24 are provided on these edge walls by reducing the height at the side which terminates as the longitudinal circular end. Holes 25 and 26 for passing through both ends of the bolt 13 are provided at both ends of the flat metal fixture 20 and upright tongues 27 and 28 higher than the edge walls 21 and 22 are provided midway between the through holes 25 and 26. These tongues are used to fix the flat metal fixture 20 to the chassis or the printed circuit board of the television set. The edge walls 21 and 22 of the flat metal fixture 20 are flushed with the edge of the reduced cylindrical part 34 of the housing 30 as shown in FIG. 4 to stabilize the flyback transformer when it is secured on the printed circuit board and distribute the weight of the flyback transformer throughout the printed circuit board to protect the printed circuit board from breakage or deformation. The steps 23 and 24 of the flat metal fixture 20 are inserted between the claws 37 and 38 shown in FIG. 2 and engaged with these claws.

The coil bobbin 50 has the cylindrical part 51 into which the legs of cores 11 and 12 are inserted, disk type vertical wall 52 which is provided to be split into two parts at a position where the axial length of the cylindrical part 51 on the outer periphery is divided into two approximately equal lengths and the flange wall 53 is split in a plurality of sectors with a certain distance from the vertical wall 52. The low voltage coil 54 is wound around between the vertical wall 52 and the flange wall 53 of the coil bobbin 50 and the other coil, if required, such as, for example, a coil to be connected to the automatic gain control circuit, automatic frequency control circuit, video circuit, heater ignition circuit of the cathode-ray tube, etc. is additionally wound thereto.

The high voltage coil 80 is mounted at an opposite side to the coil 54 of the vertical wall 52 of the coil bobbin 50. The high voltage coil 80 mounted on the cylindrical part 51 of the coil bobbin 50 maintains its position in the axial direction of the coil bobbin 50 while being depressed by the extreme end of the central cylinder 47 provided around the hole 46 for inserting the core leg which penetrates the center of the housing 40 and prevents itself from being inclined against the coil bobbin 50, thereby magnetic coupling to the low voltage coil 54 and the space and distance from the high voltage coil to all other parts can be calculated in advance.

A plurality of studs 48 are provided in the expanded chamber 45 of the housing 30 with a specified distance between them and each part of the rectifying circuit is supported between the studs 48.

Figure 6:
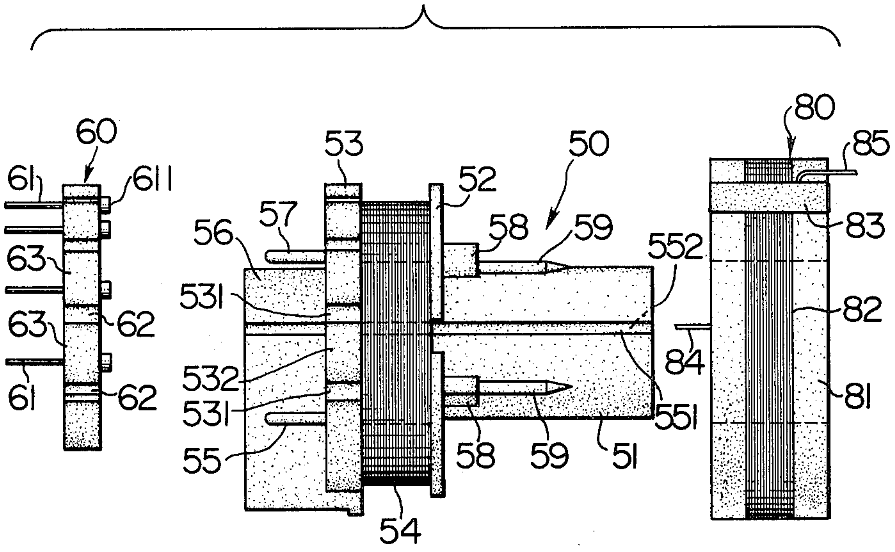
FIG. 6 is a disassembled view of the assembly comprising the coil bobbin, coil and terminal board which are housed in the housing.

FIG. 6 shows the disassembled view of the coil assembly comprising the terminal board, coil bobbin and high voltage coil. The low voltage coil 54 is wound between the vertical wall 52 and the flange wall 53 of the coil bobbin 50. Grooves 551 and 552 which continue from one end to the other in the axial direction are provided on the outer periphery of the cylindrical part 51 of the coil bobbin.

Figure 7:
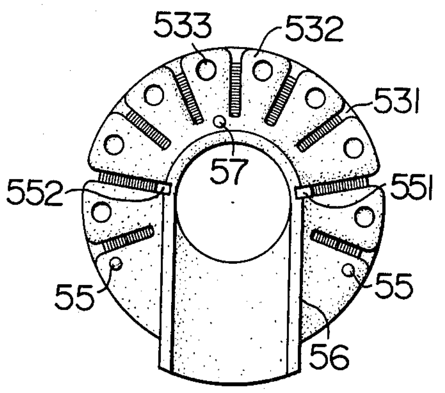
FIG. 7 is a side view of the coil bobbin shown in FIG. 6 which is viewed from the left-handed side.

The flange wall 53 is the cylindrical part 51, formed in the form of disk at right angles to divided by a plurality of slits 531 extending in the radial direction and provided with a plurality of wings 532. A circular shallow hole 533 is provided at the end part of the wing 532 as shown in FIG. 7. The grooves 551 and 552 on the cylindrical part 51 are continued to each slit 531.

The flange wall 53 is provided with bar projections 55 and 57 which are projected in the opposite side to the coil 54 with a distance and the top ends of the bar projections are melted by the heating device when the terminal board 60 is fitted to the flange wall 53 for fixing it. Moreover, at the opposite side, an extended part 56 with the U-shaped section in a vertical plane to the axial direction is formed in continuation to the cylindrical part 51. This extended part 56 overhangs the shoulders of the cores to prevent the coil bobbin 50 from rotation against the cores when the legs of the cores are inserted into the coil bobbin 50.

Figure 8:
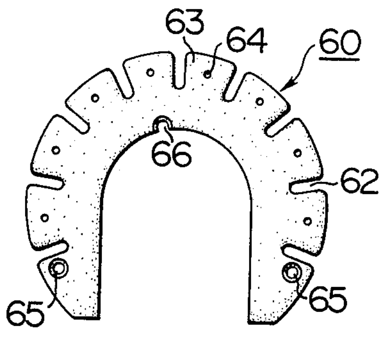
FIG. 8 is a side view of the terminal board shown in FIG. 6 which is viewed from the left-handed side.

The terminal board 60 is arranged across the extended part 56 of the coil bobbin 50 along the flange wall 53. The terminal board 60 is of a horseshoe type as shown in FIG. 8 and a plurality of shallow grooves 62 are provided from the outer periphery in the radial direction. These grooves 62 are made at the positions where the grooves are accurately aligned with the slit 531 of the flange wall 53. Each segment 63 between the grooves 62 is provided with a hole 64 which has a slightly larger diameter that the diameter of the terminal pin 61, which is inserted into the hole 64. The head 611 of the terminal pin 61 larger than the hole 64 is housed in the hole 533 provided in the sector vane 532 when the terminal board 60 is aligned with the flange wall 53. Accordingly, the terminal board 60 closely contacts the flange wall. The bar projections 55 pass through the holes 65 and 65 provided at both ends of the terminal board 60 and the bar projection 57 is fitted into the recession 66 provided in the inner periphery of the terminal board 60, and the top ends of bar projections 55 and 57 are melted and deformed to fix the terminal board 60 so that it does not come off from the flange wall 53. The low potential lead wire 84 of the high voltage coil is led out from the slit 531 and the groove 62, which are coupled, through the groove 551 or 552 under the low voltage coil 54 and connected to one terminal pin 61, and the lead wires (not shown) of the low voltage coil and other coils are led out from the rest of slits 531 and grooves 62 and connected to respective terminal pins 61.

Figure 9:
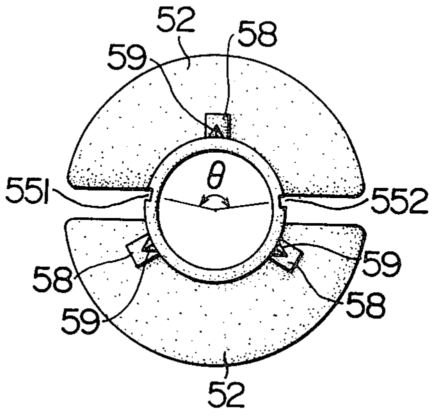
FIG. 9 is a side view of the coil bobbin shown in FIG. 6 which is viewed from the right-handed side.

At the opposite side to the flange wall 53 of the vertical wall 52 of the coil bobbin 50, three spacers 58 are provided in the circumferential direction with 120° intervals on the outer periphery of the cylindrical part 51 in contact with the vertical wall 52 and a ridge 59 extending in the axial direction on the outer periphery of the cylindrical part 51 is formed in continuation to the spacer 58. This ridge 59 is tapered toward its extreme end and its sectional shape is triangular as shown in FIG. 9. Accordingly when the high voltage coil 80 is inserted into the cylindrical part 51, the high voltage coil 80 is supported with a predetermined distance from the low voltage coil 54 due to the spacers and the ridge 59 is engaged with the inner periphery of the high voltage coil 80 to support stationarily the high voltage coil.

The grooves 551 and 552 provided on the outer periphery of the cylindrical part 51 are positioned with an angle $\theta$ smaller than 180° in reference to the cylinder axis as shown in FIG. 9.

The high voltage coil 80 is made up by winding an extremely fine wire 82 of 30 to 50$\mu$ in multiple layers with a plastic film 81 such as, for example, polyester film as the inter-layer insulation. The end of the wire is fixed with the insulating adhesive tape 83 and the high potential lead wire 85 is led out.

Figure 10:
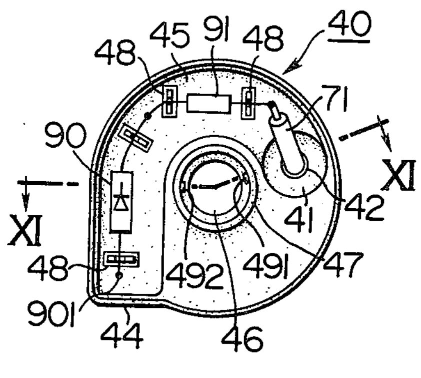
FIG. 10 is a plan view of the housing cap which houses the rectifying circuit which is viewed from the inside.

FIG. 10 is the housing cover viewed from the inside. The central cylinder 47 which projects from around the hole 46 for inserting the core legs to the inside has a slightly larger diameter than the outside diameter of the cylindrical part 51 so that the cylindrical part 51 of the coil bobbin 50 may be inserted into the central cylinder. A pair of projections 491 and 492 which extend in the axial direction and engage with the grooves 551 and 552 of the cylindrical part 51 are provided on the inner periphery of the central cylinder 47. In other words, the projections 491 and 492 we provided at the positions with angle $\theta$ formed by the grooves 551 and 552. Thus, the coupling pattern of the coil bobbin 50 and the housing cap 40 is limited to only one example to provide correct coupling at all times.

Figure 11:
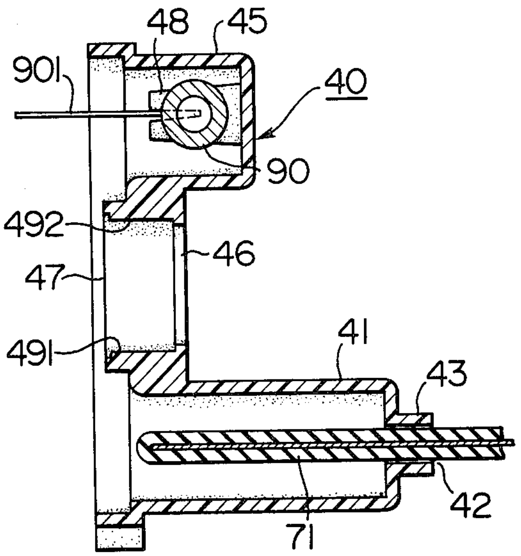
FIG. 11 is a sectional view of the housing cap which is viewed in the arrow direction from the position of the broken line in FIG. 10.

A plurality of studs 48 provided in the expanded chamber 45 have the top ends which are almost V-shaped and the lead wire is set between the V-shaped top ends to support the parts of the rectifying circuit such as the diode 90 and the resistor 91 in the air. The top ends of studs 48 are melted and deformed by a heating device such as a soldering iron so that the lead wire does not come off. The anode side lead wire 901 of the diode 90 is bent at the right angle as shown in FIG. 11, projected above the position of high potential lead wire 85 of the high voltage coil 80, connected by the lead wire 901 bound with wire 85 and then soldered. The cathode side lead wire of the diode 90 is connected to one end of the resistor 91 and the other end of the resistor is connected to the anode lead wire 71. Accordingly, no special members which support the parts of the rectifying circuit are required and the parts can be accurately positioned at the predetermined positions.

Figure 12:
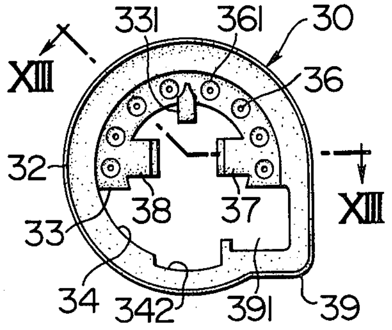
FIG. 12 is a plan view of the expanded cylindrical part and the reduced cylindrical part of the housing which are viewed in this order from the inside.

FIG. 12 shows the housing 30 which is viewed from the inside. A projecting member 331 is provided from the collar 33 toward the inside to support the extended part 56 of the coil bobbin 50 by pushing it from the outside. A recession 342 which extends along the cylinder axis and has a nearly equal width to the width of the extended part 56 is formed at a position opposing to the projecting member 331 of the reduced cylindrical part 34 and the extended part 56 of the coil bobbin is fitted into the space surrounded by claws 37 and 38, projecting member 331 and recession 342 and held so that the coil bobbin 50 does not rotate and the extended part keeps the predetermined distance from every part of the housing 30 when the coil bobbin 50 is inserted into the housing 30.

Figure 13:
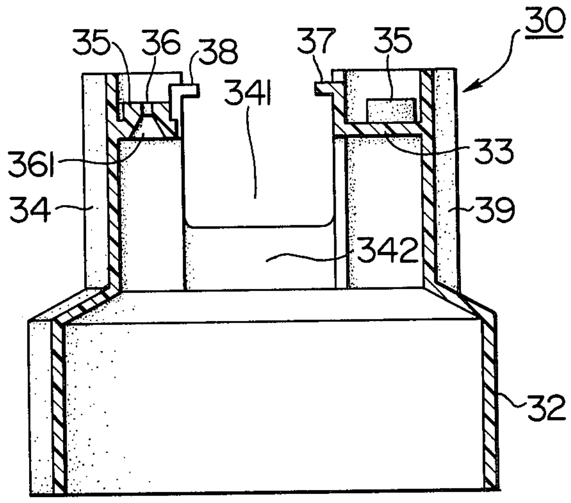
FIG. 13 is a sectional view of the cylindrical parts as viewed in the arrow direction from the position of the broken line shown in FIG. 12.

The through holes 36 which are made at equal intervals in the circumferential direction of the collar 33 to insert through the terminal pins 61 are cone-tapered in a conical shape 361 as shown in FIG. 13 and the tip ends of a plurality of terminal pins 61 provided on the terminal board 60 can be easily inserted into the holes 36 even through the terminal pins are slightly deviated from the opposing positions to the holes 36 when the coil bobbin is housed in the housing 30.

As shown in FIG. 13, a notched part 341 with a depth almost equal to the sum of the thickness from the edge of recession 342 to the core 11 and the height of walls 21 and 22 of the metal fixture 20 is provided on the reduced cylindrical part 34, and the core 11 is assembled by fitting the extended part 56 of the coil bobbin 50 to the cutaway part 341 of the housing and this assembly is fitted into the housing 30 as shown in FIG. 1.

The flyback transformer assembly assembled as shown in FIG. 1 is set in a vacuum container and the space surrounded by the housing 30, housing cap 40 and coil bobbin 50 is filled with an electrically insulating resin compound and, at the same time, the coils are impregnated. After this, the injected resin compound will be hardened at room temperature or at a temperature in the heating room.

In the above description, the most preferred embodiment of the present invention has been described in detail. It can be clearly expressed that the design can be modified within the scope of the present invention without any spoilage of the functions in accordance with the present invention. Such modification of the design is included in the scope of the present invention. For example, there can be provided one or three grooves which are extended in the axial direction on the outer periphery of the coil bobbins 50. In this case, one, two or three projections can be provided on the inner periphery of the central cylinder 47 in accordance with the number of grooves. One end of terminal pin 61 can be directly fixed in the flange wall 53 for fixing it without providing the terminal board 60. Thus no bar projections 55 and 57 will be required.

What is claimed is:

1. A flyback transformer comprising (a) a pair of U-shaped cores, (b) a coil bobbin to be mounted on the legs of said cores, (c) at least one low potential coil to be wound around said coil bobbin, (d) a high voltage coil which is mounted on said coil bobbin in parallel with said low potential coil, (e) a plurality of terminal means to be connected respectively with the lead wire of said low potential coil and the low potential side lead wire of said high voltage coil, (f) a means which supports said plurality of terminal means on said coil bobbin, (g) a hollow housing which has an opening through which said coil bobbin is inserted at its one end and another opening through which said plurality of terminal means are projected outside and the leg of said one core is inserted at its other end and houses said coil bobbin provided with said low potential coil and high voltage coil, (h) a rectifying circuit connected to the high potential side lead wire of said high voltage coil, (i) an anode lead which is connected to said rectifying circuit to take out a rectified high voltage, (j) a housing cap which is mounted on one end of said housing and has a hole for inserting the leg of said other core and houses said rectifying circuit, and (k) an electrically insulating resin compound for filling a space surrounded by said housing, housing cap and coil bobbin.

2. A flyback transformer in accordance with claim 1, wherein said housing cap includes a central cylinder which is extended inside a core inserting direction and is provided around the hole of the housing cap through which the core leg is inserted in a height where the top edge of the central cylinder contacts the side of the high voltage coil, thereby said high voltage coil is positioned at a predetermined position on the coil bobbin.

3. A flyback transformer in accordance with claim 1 or claim 2, wherein said housing cap includes an expanded chamber which is expanded outside in the core leg inserting direction and in which parts of a high voltage rectifying circuit are arranged.

4. A flyback transformer in accordance with claim 3, wherein said expanded chamber includes a means which said parts of the rectifying circuit are supported in air.

5. A flyback transformer in accordance with claim 3, wherein said housing cap includes a cylindrical expanded part which is projected outside the core leg inserting direction and an anode load wire is led out from the extreme end of said expanded part.

6. A flyback transformer in accordance with claim 1, wherein said coil bobbin is provided with a cylindrical part into which the legs of a pair of cores are inserted and a pair of disk type walls which are formed vertically with a predetermined distance in the axial direction of the cylinder on the outer periphery of said cylindrical part and a low potential coil is directly wound between said disk type walls while said high voltage coil is arranged in alignment with said low potential coil on the outer periphery of said cylindrical part.

7. A flyback transformer in accordance with claim 6, wherein an array of terminals comprise a plurality of terminal pins and are arranged around the cylindrical part at the opposite side to the high voltage coil and a spacer which determines and maintains a distance between said low potential coil and said high voltage coil.

8. A flyback transformer in accordance with claim 6 or claim 7, wherein a central cylinder which is extended inside the core leg inserting direction is provided around an opening of the housing cap through which the core leg is inserted and a means is provided which engages said central cylinder with the cylindrical part of the coil bobbin at the side where the high voltage coil is located.

9. A flyback transformer in accordance with claim 8, wherein an engaging means of the cylindrical part of said coil bobbin with the central cylinder of said housing cap is of a construction for fitting mutually said central cylinder to said cylindrical part.

10. A flyback transformer in accordance with claim 9, wherein the cylindrical part of said coil bobbin and the central cylinder of said housing cap have a fitting means which permits engagement in one engaging position only.

11. A flyback transformer in accordance with claim 10, wherein said fitting means comprises a projection and a groove which may be fitted mutually.

12. A flyback transformer in accordance with claim 9, wherein an extended part which is extended in the axial direction of the cylinder is formed at an opposite edge of the cylindrical part of the coil bobbin to the high voltage coil to prevent said coil bobbin from rotation in reference to the core.

13. A flyback transformer in accordance with claim 1, wherein said housing is provided with a collar toward inside on the inner periphery of the edge part from which an array of terminals are projected and said collar is provided with holes through which said array of terminals are penetrated, thus controlling the projecting position of said array of terminal means.

14. A flyback transformer in accordance with claim 13, wherein said coil bobbin includes an extended part is formed at an opposite edge of the cylindrical part of the coil bobbin to the high voltage coil and said housing includes a means which supports said extended part at a predetermined position and at the edge part at which the array of terminal means are projected.

15. A flyback transformer in accordance with claim 13, wherein the holes for penetration of said terminal means are tapered to be conical from the inside toward the outside of the housing.

* * * * *